United States Patent
Johnson et al.

[15] 3,650,057

[45] Mar. 21, 1972

[54] PRINTED MOUNTING SHEET

[72] Inventors: Ralph L. Johnson, Wheaton; Robert I. Henkel, Kenilworth, both of Ill.

[73] Assignee: Johnson & Quin, Inc.

[22] Filed: Sept. 8, 1970

[21] Appl. No.: 70,151

[52] U.S. Cl. ....................40/158 R
[51] Int. Cl. ....................G09f 1/10
[58] Field of Search ....................40/158, 158 B, 135, 125 A

[56] References Cited

UNITED STATES PATENTS

| | | | |
|---|---|---|---|
| 2,177,627 | 10/1939 | Drew | 40/125 A X |
| 2,191,704 | 2/1940 | Bennet | 40/125 A X |
| 2,896,351 | 7/1959 | Johnson | 40/158 B |
| 2,936,540 | 5/1960 | Power | 40/125 A X |
| 3,564,745 | 2/1971 | Johnson et al | 40/158 B |

*Primary Examiner*—Robert W. Michell
*Assistant Examiner*—Wenceslao J. Contreras
*Attorney*—Mann, Brown, McWilliams and Bradway

[57] ABSTRACT

A mounting card with plural pressure sensitive areas for mounting electrocardiograph diagrams and the like. The card uses a superimposed layer of pressure sensitive adhesive and defined mounting areas through use of an ink imprinted layer defining nonadhesive border areas around the mounting space areas.

3 Claims, 5 Drawing Figures

INVENTORS
RALPH L. JOHNSON
ROBERT I. HENKEL
BY
Mann, Brown, McWilliams & Bradway
ATTORNEYS

PRINTED MOUNTING SHEET

The present invention is directed to new and useful improvements in mounting cards for electrocardiograph diagrams and the like, and is concerned with improvements which provide economy in the manufacture of such cards and which facilitate use of such cards.

Mounting cards for films, graphs and the like having discrete pressure sensitive mounting areas for reception of films, graphs, and the like, thereon are known to the art. The mounting areas are sometimes provided with pressure sensitive adhesive areas coextensive with each mounting area so that a film, graph, or the like, may be pressed in proper position over the mounting area and held in proper position therein. One form of mounting card known to the art utilizes die cut apertures in a sheet which is placed over a pressure sensitive layer on a second sheet so that the areas of the first sheet around the die cut areas define border areas around the mounting spaces. This type of card requires the expense of die cutting and the expense of using two sheets. A second form of mounting card known to the art uses pressure sensitive adhesive placed on a mounting sheet at only those areas intended as mounting areas. Cards of this type cannot be stacked together because adjacent cards will adhere to one another. For this reason a masking sheet is fixed to the card in overlying relation to the pressure sensitive areas and, when used, this masking sheet is removed to expose the pressure sensitive areas. This later type of mounting card requires the expense of forming discrete mounting areas on a card with pressure sensitive adhesive and the expense of fixing a masking sheet in overlying relation to the card. The masking sheet must, of course, be removed and discarded before the card is used.

With the foregoing in mind, the principal purposes of the present invention are to provide a pressure sensitive adhesive mounting card for films, electrocardiograph diagrams and the like utilizing a single card or sheet with discrete adhesive areas and nonadhesive border areas around the adhesive areas, while forming the card or sheet in such a manner that plural cards may be stacked on top of one another without substantial adherence from one card to another, thus eliminating the requirement of a second masking or border defining sheet.

These and other purposes will become apparent in the course of the ensuing specification and claims, when taken with the accompanying drawings, in which:

Like elements are designated by like characters throughout the specification and drawings.

Figure 1:
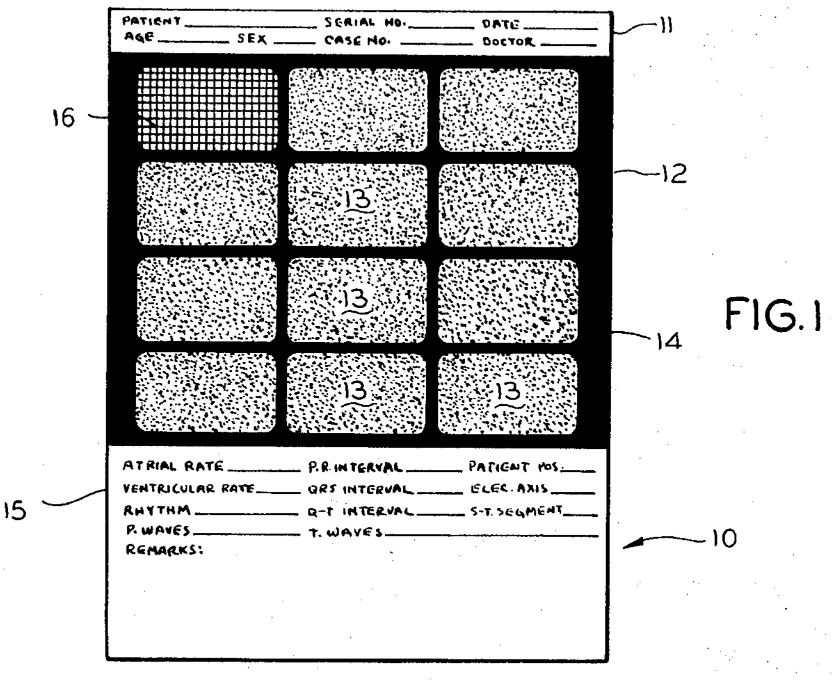
FIG. 1 is a plan view of a typical mounting card formed in accordance with the present invention.

With specific reference now to the drawings, the numeral 10 designates a mounting card body in sheet form and formed of paper or equivalent material suitable for receiving printing thereon. Sheet 10 may have a thickness of approximately 0.007 inch. It should be understood that the thickness of the sheet may vary considerably depending upon desired handling characteristics. Sheet 10 is shown as a mounting card for electrocardiograph studies. Sheet 10 has an upper portion 11 which may contain printed matter such as a patient's name, serial number, age, etc. Sheet 10 has an intermediate mounting area 12 which is divided into a plurality of discrete pressure sensitive adhesive areas 13 arranged in rows extending alongside one another. Border areas between the mounting areas 13 are designated at 14 and are defined by an ink layer which overlies and masks or neutralizes the adhesive. The bottom portion of the card may carry further printed matter related to technical data associated with the diagrams which are placed over the mounted areas. One such diagram 16 is shown in position over a mounting area in FIG. 1.

Figure 2:
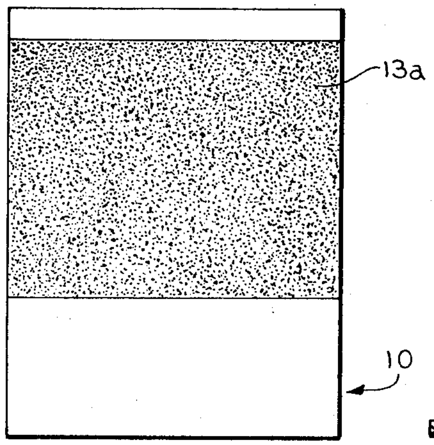
FIG. 2 is a diagrammatic view of a card partially formed in a method of making the mounting card illustrated in FIG. 1.
Figure 4:
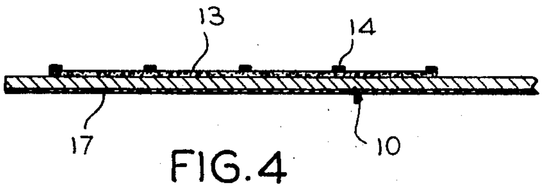
FIG. 4 is a sectional view, in exaggerated form, of a mounting card as illustrated in FIG. 1.

As will be appreciated in FIG. 4, the sheet 10 is provided with a silicone coating 17 which is highly resistant to adherence to the pressure sensitive adhesive used in the mounting areas of the card, for a purpose which will appear hereinafter. Sheet 10 has an overlying layer of pressure sensitive adhesive 13*a* extending from side to side of the card as illustrated in FIG. 2 and extending over the entire area of the card which surrounds and includes the mounting areas 13. Printed border defining material in the form of ink is in overlying relation to the pressure sensitive area 13*a* to define the mounting areas.

Figure 3:
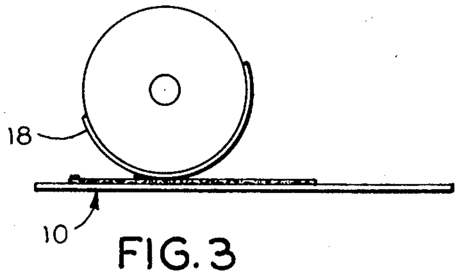
FIG. 3 is a diagrammatic view of another step in the process of making the mounting card illustrated in FIG. 1 and illustrating a further step in processing the card illustrated in FIG. 2.

In fabricating mounting cards, a card with the silicone backing is first given a coating of pressure sensitive adhesive on that portion of the card which includes all of the mounting areas and the border areas. This coated area extends from side to side of the card and over a substantial part of the card as is illustrated in FIG. 2. After the card is provided with the pressure sensitive coating 13*a* the card is subjected to a printing process in which a printing plate diagrammatically represented at 18 in FIG. 3 carries the image of the border areas and prints the border areas over the pressure sensitive area 13*a*.

The ink used in such a process may be a commercially available ink known as Flexo Gray F.T. 110 and formulated as follows:

| | |
|---|---|
| Binder | |
| Nitrocellulose (spirit soluble) dry base (cellulose nitrate—10.9–11.2% nitrogen) | 7.3% |
| Plasticizer | |
| Dibutyl phthalate | 5.0% |
| Solvents | |
| Normal propyl acetate | 4.0% |
| Cellosolve (2-ethoxy ethanol) | 8.5% |
| Ethyl alcohol (anhydrous) | 35.7% |
| Pigments | |
| Titanium dioxide | 33.6% |
| Carbon black | 3.2% |
| Iron blue (ammonium ferri-ferrocyanide) | 2.7% |
| Total: | 100.0% |

The ink adheres to the adhesive while neutralizing or masking the adhesive.

When cards are formed as disclosed herein, only a single mounting sheet is used for each mounting assembly. It is relatively simple to place a large pressure sensitive coating over a large defined area of the card extending from side to side of the card as illustrated in FIG. 2. Masking out border areas by imprinting over defined areas of the pressure sensitive area provides economies in the manufacture of the cards.

It should be understood that the printed matter appearing on other portions of the card as at 11 and 15 may be printed on the card either before or after the printing process which defines the mounting areas of the card. In some cases, the same printing plate and ink used to print the border areas of the card may be used to provide the printed information on the card so that a single pass of the card through a printing press produces the card in its final form.

Use of a printing process as herein defined enables a simple and economic formation of any pattern of pressure sensitive areas to be defined on a mounting card. All sorts of geographic patterns and arrangements of pressure sensitive mounting areas may be easily defined on the printing plate in accordance with known printing processes.

Figure 5:
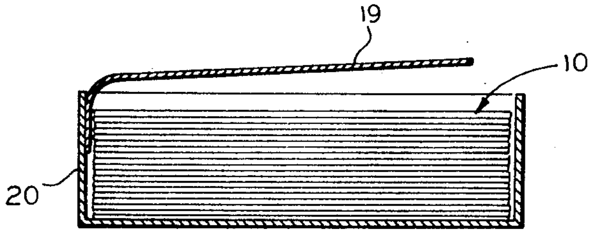
FIG. 5 is a sectional view illustrating plural cards incorporating the principles of the present invention while in stacked relation.

After the cards are printed in final form they may be easily stacked on top of one another as represented in FIG. 5 with no masking sheet between the cards. A single cover sheet 19 may be fixed to one side of a box 20 for a group of cards and used to overlie only the top sheet in the box.

The cards may adhere slightly to one another but, because of the silicone backing for the cards, they are easily separated when it is desired to use the cards.

The printed mounting areas enable handling of the card along both edges. After the diagrams or the like are all positioned in the mounting areas, all pressure sensitive adhesive is masked.

We claim:

1. A mounting card for graphs, pictures, and the like including a single sheet having a silicone coating on the back of the sheet, the front of the sheet having a pressure sensitive adhesive area thereon, said pressure sensitive adhesive area being divided into a plurality of mounting areas by a printed ink defining border area between mounting areas and overlying the parts of the pressure sensitive adhesive area between said mounting areas, said ink being adhered to said pressure sensitive adhesive while rendering said border areas substantially nonadhesive.

2. A card as set forth in claim 1, wherein said pressure sensitive area extends from one side edge of the sheet to an opposite side edge.

3. The method of manufacturing a mounting card having a plurality of discrete pressure sensitive areas on one face thereof including the steps of coating a predetermined area of an upper surface of a sheet having a silicone coating on the back thereof with pressure sensitive adhesive, and printing border areas over said pressure sensitive area with an ink which neutralizes the adhesive effect of said pressure sensitive adhesive in said border areas while adhering to said adhesive and leaving a plurality of defined pressure sensitive mounting areas between border areas.

* * * * *